US006455649B1

(12) United States Patent
Fukui et al.

(10) Patent No.: US 6,455,649 B1
(45) Date of Patent: Sep. 24, 2002

(54) CATALYST FOR PRODUCING LIVING OLEFIN POLYMER AND PROCESS FOR PRODUCING THE POLYMER

(75) Inventors: Yoshihumi Fukui, Tsukuba (JP); Masahide Murata, Tokyo (JP); Kazuo Soga, deceased, late of Ishikawa-ken (JP), by Hisae Soga, executor; Michihiko Asai, Tsukuba (JP); Yasuzou Suzuki, Tsukuba (JP); Akira Miyazawa, Tsukuba (JP); Kenji Tsuchihara, Tsukuba (JP); Hiroyuki Ozaki, Tsukuba (JP); Masanao Kawabe, Tsukuba (JP); Naoya Kishi, Kanazawa (JP)

(73) Assignees: Japan as represented by Director General of Agency of Industrial Science and Technology, Tokyo (JP); Japan Chemical Innovation Institute, Tokyo (JP)

( * ) Notice: Subject to any disclaimer, the term of this patent is extended or adjusted under 35 U.S.C. 154(b) by 0 days.

(21) Appl. No.: 09/486,967

(22) PCT Filed: Sep. 7, 1998

(86) PCT No.: PCT/JP98/04006

§ 371 (c)(1), (2), (4) Date: Feb. 23, 2001

(87) PCT Pub. No.: WO99/12980

PCT Pub. Date: Mar. 18, 1999

(30) Foreign Application Priority Data

Sep. 9, 1997 (JP) .............................................. 9-244312

(51) Int. Cl.[7] .................................................. C08F 4/68
(52) U.S. Cl. .................... 526/169.2; 526/336; 526/339; 502/103; 502/104; 502/108; 502/118; 502/161
(58) Field of Search .............................. 526/169.2, 336, 526/339; 502/103, 104, 108, 118, 161

(56) References Cited

PUBLICATIONS

Murata, M. et al., "Syntheses and Applications of Terminally Functionalized Polyolefins," *Kobunshi* (*High Polymers*), V. 44, pp. 436–440, (Jul. 1995).
Murata, M., et al., "Terminally Functionalized Polyolefins," *Gosei Jyushi* (*Plastics*), V. 42, pp. 32–35, (Apr. 1996).
Mashima, K. et al., "Living Polymerization Catalyzed by Organometallic Complexes," *Catalysis Society of Japan*, (1994).
Yasuda, H. et al., "Living Polymerizations Catalyzed by Rare Earth Complexes," *Kobunshi* (*High Polymers*), V. 43, pp. 534–538, (Aug. 1994).
Scollard, J.D. et al., "Living Polymerization of α–Olefins by Chelating Diamide Complexes of Titanium," *J. Am Chem. Soc.*, v. 118, pp 10008–10009, (1996).

(List continued on next page.)

*Primary Examiner*—David W. Wu
*Assistant Examiner*—Caixia Lu
(74) *Attorney, Agent, or Firm*—Nath & Associates PLLC; Gary M. Nath; Joshua B. Goldberg

(57) ABSTRACT

A catalyst comprising an organoaluminum compound and a vanadium chelate compound having the lability to cause olefins to undergo living coordination polymerization is contacted with a terminal diolefin to obtain a catalyst for living polymer production. When the above contact is conducted in the presence of a cycloolefin or an internal olefin, the yield of a living polymer can be improved. By modifying all ends of the living polymer obtained, a telechelic olefin polymer is obtained in which all the polymer chains are modified with functional groups.

10 Claims, 1 Drawing Sheet

OTHER PUBLICATIONS

Shapiro, P.J. et al., "Model Ziegler–Natta α–Olefin Polymerization Catalysts Derived from [{η$^5$–C$_5$Me$_4$)SiMe$_2$(η$^1$–NCMe$_3$} (PMe$_3$) Sc (μ$_2$–H)]$_2$ and [} (η$^5$–C$_5$Me$_4$)SiMe$_2$(η$^1$–NCMe$_3$)}Sc (μ$_2$–CH$_2$CH$_2$Ch$_3$)]$_2$. Synthesis, Structures, and Kinetic and Equilibrium Investigations of the Catalytically Active Species in Solution" *J. Am. Chem. Soc.,* v. 116, pp. 4623–4640, (1994).

Coughlin, E.Bryan et al., "Iso–Specific Ziegler–Natta polymerization of μ–Olefins with a Single–component Organoyttrium Catalyst," *J. Am. Chem. Soc.,* v. 114, pp. 7606–7607, (1992).

Baumann, Robert et al., "Synthesis of Titanium and Zirconium Complexes That Contain the Tridentate Diamido Ligand, {((t–Bu–D$_6$) N–o–C$_6$H$_4$)$_2$O}$^2$– ([NON]$^2$–) and the Living [NON]ZrMe$_2$," *J. Am. Chem. Soc.,* V.119, pp. 3830–3831, (1997).

Wang, Lin et al., "Coordination Polymerization of Ethylene by Single–Component Rhodium Catalysts in Protic Solvents," *J. Am. Chem. Soc.,* V. 115, pp. 6999–7000, (1993).

Jeske, Gerald et al., "Highly Reactive Organolanthanides. Systematic Routes to and Olefin Chemistry of Early and Late Bis (pentamethylcyclopentadienyl) 4f hydrocarbyl and Hydride Compleses," *J. Am. Chem. Soc.,* v. 107, pp. 8091–8103, (1985).

Killian, Christopher M. et al. "Living polymerization of a–Olefins Using Ni11–a–Diimine Catalysts. Synthesis of New Block Polymers Based on a–Olefins," J. Am. Chem. Soc. V. 118, pp. 11664–11665, (1996).

Mashima, K. et al., "Living Polymerization Catalyzed by Organometallic Complexes," *Catalysis Society of Japan,* pp. 572–579 (1994).

CATALYST FOR PRODUCING LIVING OLEFIN POLYMER AND PROCESS FOR PRODUCING THE POLYMER

TECHNICAL FIELD

The present invention relates to a catalyst for producing a living olefin polymer, a process for producing the polymer, and a process for producing a telechelic olefin polymer.

BACKGROUND ART

Crystalline polyolefins such as polyethylene and isotactic polypropylene are superior in mechanical physical properties and utilized widely in structural materials such as automobile parts requiring high strength. On the other hand, polyolefins are hydrocarbon macromolecules which are hardly compatible with materials having polar groups, such as coatings and dyestuffs. To render polyolefins readily compatible with these materials and more functional, functional groups may be added to the polyolefin molecules.

Aiming at a highly functional polyolefin, there has been an attempt to attach a functional group to the polyolefin by synthesizing a highly chemically reactive living polyolefin having catalytically active species bound to its polymer terminals, and chemically modifying the polyolefin with a functional group attaching compound by utilizing the reactivity of these polymer terminals.

For example, as shown in "Kobunshi (High Polymers)", Vol. 44, pp. 436–440, July issue (1995), "Gosei Jyushi (Plastics)", Vol. 42, pp. 32–35, April issue (1996) etc., it is known that one terminal of living polypropylene synthesized with a catalyst consisting of a vanadium acetyl acetonate complex and an organoaluminum compound is modified to provide the terminal with iodine, an amino group, aldehyde group, vinyl group, phenyl group, methacrylate group, trimethylsiloxy group, glycidyl group, carboxylic acid chloride etc.

In the processes described above, however, it is not possible to introduce a functional group into the other terminal of living polypropylene as the terminal for growth initiation, so there is a limit to a higher functionalization of polypropylene.

The object of the present invention is to provide a catalyst for producing a living olefin polymer which enables one to produce a telechelic olefin polymer in which all the terminals of polyolefin polymer chains have been modified with arbitrary functional groups, a process for producing the polymer, and a process for producing a telechelic olefin polymer.

As a result of their eager study, the present inventors found that a catalyst having a plurality of living polymerization active sites is obtained by reacting a living polymerization catalyst for olefins one after another with a compound having a plurality of carbon-carbon double bonds in the molecule, then a living polymer having active sites at all the terminals of its polymer chain: is formed by using this catalyst for living polymerization of olefins, and these active sites are converted by modification into arbitrary functional groups, whereby all the terminals of its polymer chain can be provided with the functional groups. The present invention was thereby completed.

DISCLOSURE OF THE INVENTION

That is, the essence of the present invention lies in a catalyst for producing living olefin polymers, obtained by contacting a catalyst having the ability to cause ethylene and/or olefins (excluding ethylene) to undergo living coordination polymerization, with a compound having a plurality of intramolecular carbon-carbon double bonds.

Further, the catalyst for producing living olefin polymers according to the present invention is characterized in that the olefins are α-olefins of 3 to 8 carbon atoms.

In addition, the catalyst for producing living olefin polymers according to the present invention is characterized in that the catalyst having the ability to cause living coordination polymerization comprises a vanadium compound represented by the general formula I:

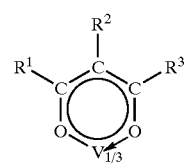

(wherein $R^1$ to $R^3$ represent a hydrogen atom or a hydrocarbon group of 1 to 8 carbon atoms provided that at least one of $R^1$ to $R^3$ is a hydrogen atom but not all $R^1$ to $R^3$ are hydrogen atoms) and an organoaluminum compound represented by the general formula $R_nAlX_{3-n}$ (wherein R represents an alkyl group of 1 to 18 carbon atoms or an aryl group, X represents a halogen atom or a hydrogen atom, and n is an arbitrary real number in the range of $1 \leq n < 3$).

Furthermore, the catalyst for producing living olefin polymers according to the present invention is characterized in that the compound having a plurality of intramolecular carbon-carbon double bonds is an α,ω-unconjugated diene of 5 to 14 carbon atoms.

Moreover, the catalyst for producing living olefin polymers according to the present invention is characterized by being obtained by contacting the catalyst having the ability to cause living coordination polymerization with the compound having a plurality of intramolecular carbon-carbon double bonds, in the presence of olefins not polymerized by the catalyst having the ability to cause living coordination polymerization.

In addition, the catalyst for producing living olefin polymers according to the present invention is characterized in that the olefins not polymerized by the catalyst having the ability to cause living coordination polymerization are cycloolefins or internal olefins or olefins substituted at the 2-position.

Further, the essence of the present invention lies in a process for producing living olefin polymers, comprising homopolymerization or copolymerization of ethylene and/or olefins (excluding ethylene) in the presence of the catalyst for producing living olefin polymers described above.

Furthermore, the process for producing living olefin polymers according to the present invention is characterized in that the olefins are α-olefins of 3 to 8 carbon atoms.

Moreover, the process for producing living olefin polymers according to the present invention is characterized by homopolymerization of propylene or copolymerization thereof with ethylene.

Finally, the essence of the present invention lies in a process for producing telechelic olefin polymers, comprising chemical modification of the terminals of living olefin polymers produced by the process described above.

BEST MODE FOR CARRYING OUT THE INVENTION

Figure 1:
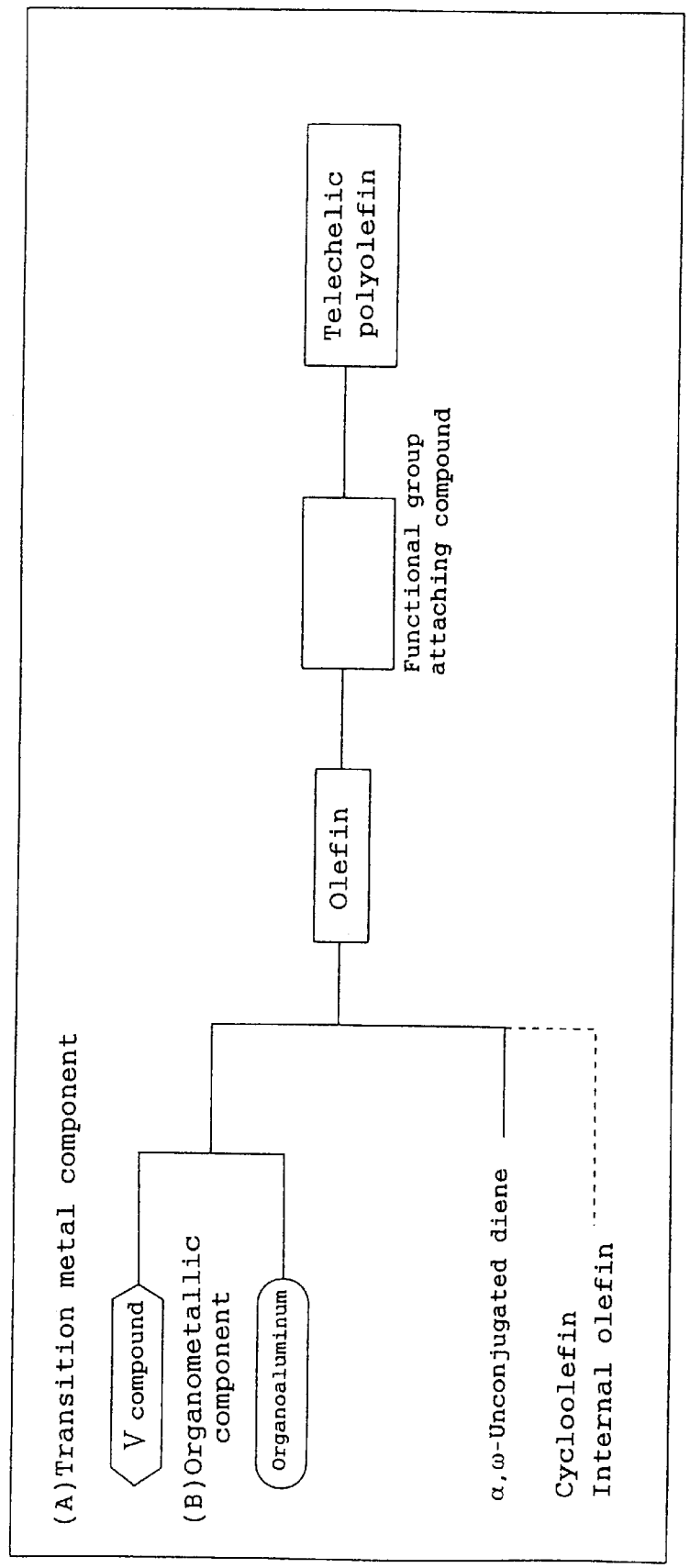
FIG. 1 is a flow chart showing the process for producing the catalyst according to the present invention.

The catalyst for producing living polyolefin polymers according to the present invention (referred to hereinafter as the catalyst of the present invention) is obtained by contacting a catalyst (referred to hereinafter as catalyst A) having the ability to cause ethylene and/or olefins (excluding ethylene) to undergo living coordination polymerization, with a compound having a plurality of intramolecular carbon-carbon double bonds (referred to hereinafter as compound "a").

The olefins mentioned above include α-olefins of 3 or more carbon atoms, and α-olefins of 3 to 8 carbon atoms such as propylene, 1-butene, 1-hexene, 4-methyl-1-pentene and 1-octene are preferable in particular.

Catalyst A is a catalyst having the ability to cause ethylene and/or the olefins to undergo living coordination polymerization, and illustrative examples include: a catalyst consisting of a diene complex of tantalum or niobium and MAO (methylaminoxane) according to Mashima and Nakamura ("Shokubai" (Catalyst), 36, 8, 572 (1994)), a catalyst consisting of [ArN=C—(R)—C=NAr] NiBr$_2$ (Ar: 2,6-i-$(C_3H_7)_2C_6H_3$or 2,6-t-$C_4H_9C_6H_4$, R: 1,8-naphthalene group) and MAO according to Brookhart (Journal of American Chemical Society, 118, 11664 (1996)), a catalyst consisting of [RN—$(CH_2)_3$ NR]Ti $(CH_3)_2$ (R: 2,6-i-$C_3H_7)_2C_6H_3$ or 2,6-$(CH_3)_2C_6H_3$) and B$(C_6F_5)_3$ according to McConville (Journal of American Chemical Society, 118, 10008 (1996)), a catalyst consisting of $\{[NON]ZrCH_3\}[CH_3B(C_6F_5)_3]$ or $\{[NON]ZrCH_3(C_6H_5N(CH_3)_2\}[B(C_6F_5)_4]$ according to Schrock (Journal of American Chemical Society, 119, 3830 (1997)), a catalyst consisting of $[Cp_2LuH]_2$ (Cp is a cyclopentadienyl group; this definition applies hereinafter) according to Marks et al. (Journal of American Chemical Society, 107, 8091 (1985)), an yttrium complex according to Bercaw et al. (Journal of American Chemical Society, 114, 7606 (1992)), an yttrium complex according to Yasuda et al. (Kobunshi, 43, 534 (1994)), an yttrium alkoxy complex [YCp (ArO) $(\mu$-H)]$_2$ (Organometallics, 13, 69 (1994)), a scandium complex (Journal of American Chemical Society, 116, 4623 (1994)), $[Cp_2SmH]_2$, $[CpCrCH_3(THF)_2]^+$, $[CpCo(CH_2CH_3)P(OCH_3)_3]^+$, a triflate complex of rhodium (Journal of American Chemical Society, 115, 6999 (1993)), and a vanadium compound represented by the general formula I:

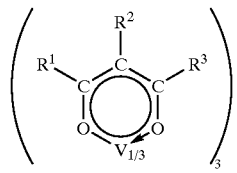

(wherein $R^1$ to $R^3$ represent a hydrogen atom or a hydrocarbon group of 1 to 8 carbon atoms provided that at least one of $R^1$ to $R^3$ is a hydrogen atom but not all $R^1$ to $R^3$ are hydrogen atoms) and an organoaluminum compound represented by the general formula $R_nAlX_{3-n}$ (wherein R represents an alkyl group of 1 to 18 carbon atoms or an aryl group, X represents a halogen atom or a hydrogen atom, and n is an arbitrary real number in the range of $1 \leq n < 3$. Among these compounds, the catalyst consisting of a vanadium compound represented by the general formula I above and an organoaluminum compound represented by the general formula $R_nAlX_{3-n}$ is particularly preferable.

Examples of vanadium compounds represented by the general formula I described above are as follows:

In the case where $R^2$ is a hydrogen atom and $R^1$ and $R^3$ are hydrocarbon groups:
$R^1/R^3$: $CH_3/CH_3$, $CH_3/C_2H_5$, $C_2H_5/C_2H_5$, $CH_3/C_6H_5$, $C_2H_5/C_6H_5$, $C_6H_5/C_6H_5CH_3/C_6H_5CH_2$, $C_6H_5CH_2/C_6H_5CH_2$, $C_2H_5/C_6H_5CH_2$, and $C_6H_5/C_6H_5CH_2$.

In the case where $R^2$ is a hydrocarbon group and either $R^1$ or $R^3$ is a hydrogen atom and the other is a hydrocarbon group:
$R^2/R^1$ or $R^3$: $CH_3/CH_3$, $C_2H_5/CH_3$, $CH_3/C_2H_5$, $C_2H_5/C_2H_5$, $C_2H_5/CH_3$, $CH_3/C_6H_5$, $C_6H_5/C_2H_5$, $C_2H_5/C_6H_5$, $C_6H_5/C_6H_5$, $C_6H_5CH_2/CH_3$, $CH_3/C_6H_5CH_2$, $C_6H_5CH_2/C_6H_5CH_2$, $C_6H_5CH_2/C_2H_5$, $C_2H_5/C_6H_5CH_2$, $C_6H_5CH_2/C_6H_5$, $C_6H_5/C_6H_5CH_2$.

In the case where $R^2$ is a hydrogen atom and either $R^1$ or $R^3$ is a hydrogen atom and the other is a hydrocarbon group:
$R^1$ or $R^3$: $CH_3$, $C_2H_5$, $C_6H_5$, $C_6H_5CH_2$.

Among those described above, the following compounds are particularly preferable:

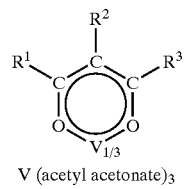

V (acetyl acetonate)$_3$

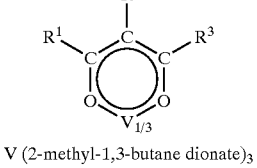

V (2-methyl-1,3-butane dionate)$_3$

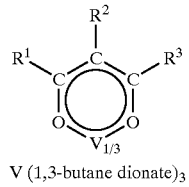

V (1,3-butane dionate)$_3$

Particularly preferable examples of organoaluminum compounds represented by the general formula $R_nAlX_{3-n}$ above are those containing 1 to 18 carbons, preferably 2 to 6 carbon atoms, such as dialkyl aluminum monohalides, monoalkyl aluminum dihalides, alkyl aluminium sesquihalides or mixtures thereof or complex compounds thereof. Specific examples include dialkyl aluminum monohalides such as dimethyl aluminum chloride, diethyl aluminum chloride, diethyl aluminum bromide, diethyl aluminum iodide and diisobutyl aluminum chloride; monoalkyl aluminum dihalides such as methyl aluminum dichloride, ethyl aluminum dichloride, methyl aluminum dibromide, ethyl aluminum dibromide, ethyl aluminum diiodide and isopropyl aluminum dichloride; and alkyl aluminum sesquihalides such as ethyl aluminum sesquichloride etc.

The ratio of the vanadium compound represented by the general formula I to the organoaluminum compound represented by the general formula $R_nAlX_{3-n}$ used is usually 1 to 1,000 moles of the organoaluminum compound per mole of the vanadium compound.

The compound (compound "a") having a plurality of intramolecular carbon-carbon double bonds, which is contacted with the catalyst A, includes polyene compounds such as diene, triene and tetraene, and preferable examples are unconjugated dienes of 5 or more carbon atoms represented by the general formula II:

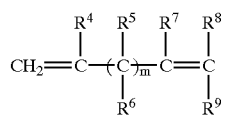

(wherein $R^4$ and $R^7$ are hydrogen atoms or alkyl groups of 1 to 4 carbon atoms and may be the same or different, $R^5$ and $R^6$ are hydrogen atoms or alkyl groups of 1 to 4 carbon atoms and may be the same or different, $R^8$ and $R^9$ are hydrogen atoms or alkyl groups of 1 to 8 carbon atoms and may be the same or different, and m is an integer of 0 to 16), and particularly preferable examples are α,ω-unconjugated dienes of 5 to 14 carbon atoms wherein $R^8$ and $R^9$ are hydrogen atoms.

Specific examples of unconjugated dienes represented by the general formula II include 1,4-pentadiene, 3-methyl-1, 4-pentadiene, 1,5-hexadiene, 3-methyl-1,5-hexadiene, 2,5-dimethyl-1,5-hexadiene, 1,6-heptadiene, 1,7-octadiene, 1,8-nonadiene, 1,9-decadiene, 1,13-tetradecadiene etc.

Catalyst A may be contacted with compound "a" in any method, but when the above-described catalyst consisting of a vanadium compound and an organoaluminum compound is used as catalyst A, their contact should preferably be conducted in a solvent in which the catalyst and the compound "a" can be dissolved, and examples of such solvents include saturated aliphatic hydrocarbons such as propane, butane, pentane, hexane and heptane, saturated alicyclic hydrocarbons such as cyclohexane and cycloheptane, and aromatic hydrocarbons such as benzene, toluene and xylene. The contact of the catalyst with the compound "a" is conducted at −100 to −30° C., preferably at −80 to −65° C., and for 10 minutes to 10 hours, preferably for 30 minutes to 5 hours. The contacting ratio of both of them is usually 0.01 to 10 moles of the compound "a" per mole of the catalyst.

In the present invention, living olefin polymers can be produced efficiently and more preferably when the catalyst A is contacted with the compound "a" in the presence of olefins not polymerized by catalyst A.

Examples of such olefins not polymerized by catalyst A include internal olefins of 6 or more carbon atoms such as 2-hexene, 2-methyl-2-pentene, 2,2,4-trimethyl-2-pentene and 2,3-dimethyl-2-butene, olefins of 6 or more carbon atoms substituted at the 2-position, such as 2-methyl-1-pentene, and cycloolefins of 5 or more carbon atoms such as cyclohexene, 1-methyl-cyclohexene, 4-methyl-cyclohexene, cyclopentene and cycloheptane. Among these, cyclohexene, 2-methyl-2-pentene, 2-methyl-1-pentene, 2,2, 4-trimethyl-2-pentene and 4-methyl-cyclohexane are particularly preferable. When the above-described catalyst consisting of a vanadium compound and an organoaluminum compound is used as catalyst A, these non-polymerizable olefins are used in amount of preferably 1 ml to 100 ml per mmol of the vanadium compound.

Further, the present invention relates to a process for producing living olefin polymers, which comprises homopolymerization or copolymerization of ethylene and/or olefins (excluding ethylene) in the presence of the catalyst of the present invention described above.

The olefins to be homopolymerized or copolymerized include α-olefins such as propylene, 1-butene, 1-hexene, 4-methyl-1-pentene and 1-octene. The present invention is particularly suitable for homopolymerization of propylene or copolymerization of propylene with ethylene to produce their living polymers.

The (co)polymerization reaction is conducted preferably in a solvent which is inert to the (co)polymerization reaction and liquid during (co)polymerization, and the solvent includes saturated aliphatic hydrocarbons such as propane, butane, pentane, hexane and heptane, saturated alicyclic hydrocarbons such as cyclopropane and cyclohexane, and aromatic hydrocarbons such as benzene, toluene and xylene.

The amount of the catalyst used in homopolymerization or copolymerization of ethylene and/or the olefins described above is varied depending on the type of catalyst A used in preparing the catalyst, and can thus not be specified unconditionally. When the above-described catalyst consisting of a vanadium compound and an organoaluminum compound is used as catalyst A, for example, the amount of the vanadium compound is $1 \times 10^{-4}$ to 0.1 mol, preferably $5 \times 10^{-4}$ to $5 \times 10^{-2}$ mol and the amount of the organoaluminum compound is $1 \times 10^{-4}$ to 0.5 mol, preferably $1 \times 10^{-3}$ to 0.1 mole, respectively per mole of ethylene and/or the olefins described above. The organoaluminum compound is preferably 4 to 100 mols per mole of the vanadium compound.

The homopolymerization or copolymerization described above is conducted usually at −100° C. to +10° C. for 0.5 to 100 hours. The molecular weight and yield of the resulting living polymer can be regulated by varying the (co)polymerization temperature and the (co)polymerization time. By setting the (co)polymerization temperature low, as low as −30° C. or below, in particular, a polymer having a nearly monodisperse molecular-weight distribution can be obtained.

A reaction promoter can be used for the homopolymerization or copolymerization described above. The reaction promoter is different depending on the type of catalyst A and can thus not be unconditionally defined. When the above-described catalyst consisting of a vanadium compound and an organoaluminum compound is used as catalyst A, for example, the reaction promoter includes anisole, water, oxygen, alcohols (methanol, ethanol, isopropanol etc.) and esters (ethyl benzoate, ethyl acetate etc.). The amount of the promoter used is usually 0.1 to 2 mols per mole of the vanadium compound. Nearly monodisperse living olefin polymers having a number average molecular weight of about 1,000 to about 50,000 can be produced according to the process described above.

The present invention further relates to a process for producing telechelic olefin polymers by chemically modifying the terminals of the living olefin polymers obtained in the manner described above. The method of chemically modifying the terminals can be realized by reacting a functional group attaching compound with the living polymer.

The method of reacting a functional group attaching compound with the living polymer to chemically modify the terminal of the polymer is known in the art, and any of such known methods can be used in the present invention. The functional group attaching compound includes carbon monoxide, 1,4-butadiene, styrene, propylene oxide, methacrylic acid derivatives (methyl ester, vinyl ester, trimethylsiloxyethyl ester, dimethylaminoethyl ester, glycidyl ester, methacryloyloxyethyl ester, acid chloride etc.), divinyl benzene, iodine, ethylene diamine etc. The reaction conditions may be the same as in a known method. According to the reaction described above, functional groups such as formyl group, vinyl group, phenyl group, hydroxyl group, ester group, amino group, epoxy group, methacryloyl group, carboxylic acid chloride, styryl group and halogen can be introduced into all the terminals of polyolefins.

Telechelic polymers can be produced in the manner described above, and can be precipitated and recovered by contacting them with a proton donor. The proton donor includes alcohols such as methanol,. ethanol and phenol and mineral acids such as hydrochloric acid and sulfuric acid. The alcohol and mineral acid may be used simultaneously. The proton donor is used usually in large excess. Their contact with the proton donor may be conducted usually at −100° C. to +100° C. for 1 minute to 10 hours.

The present invention is constituted as described above, and its action is as follows. The catalyst A having the ability to cause olefins to undergo living coordination polymerization is reacted one after another with the compound "a" having a plurality of carbon-carbon double bonds in the molecule, particularly at the terminals of the molecule, whereby a catalyst having a plurality of living polymerization active sites for olefins can be obtained. When this catalyst is used for polymerization of olefins, living polymerization is initiated from each active site to form linear or branched living polymers having active sites at all the terminals of polymer chains. Then, the polymers are modified by reacting a specific compound with the active sites, whereby telechelic olefin polymers having functional groups introduced into all polymer terminals can be produced.

Hereinafter, the present invention is described in more detail by reference to the Examples. The molecular weight of polymers was determined by GPC using tetrahydrofuran as the developing solvent at a column temperature of 40° C. For determination of the molecular weight, polystyrene was used as standards.

EXAMPLE 1

6.4 ml toluene, 0.5 mM V (acetyl acetonate)$_3$ solution in toluene, 5 mM diethyl aluminum chloride solution in toluene and 0.025 mM 1,7-octadiene were poured into a 200-ml flask with the atmosphere replaced sufficiently by a nitrogen gas, and the mixture was stirred at −78° C. for 1 hour. The resulting product was washed with an aqueous solution of dilute hydrochloric acid, and measurement of its $^1$H-NMR spectrum indicated no peak assigned to diene.

EXAMPLES 2 to 4

The same reaction as in Example 1 was conducted except that 1,8-nonadiene (Example 2), 1,9-decadiene (Example 3) or 1,13-tetradecadiene (Example 4) was used in place of 1,7-octadiene and that the stirring time was 2 hours. Any $^1$H-NMR spectra of the products indicated no peak assigned to diene.

EXAMPLE 5

Toluene, V (acetyl acetonate)$_3$ solution in toluene, diethyl aluminum chloride solution in toluene, and 1,7-octadiene were stirred at −78° C. for 1 hour in the same manner as in Example 1. Then, 35 g (830 mmol) propylene was added thereto and polymerization was initiated at the same temperature. After 2 hours, the reaction solution was poured into methanol cooled at −78° C. to precipitate the polymer. The resulting polymer was washed 5 times with 500 ml methanol and then dried. By analysis of the formed polymer (0.10 g) by GPC, two peaks were obtained, and after Gaussian approximation, the number average molecular weight (Mn) of one peak (relative peak. area: 1%) was 29,000, and Mn of the other peak (relative peak area: 99%) was 14,000.

EXAMPLE 6

6.4 ml toluene, 0.5 mM V (acetyl acetonate)$_3$ solution in toluene, 5 mM diethyl aluminum chloride solution in toluene, 0.025 mM 1,7-octadiene and 2.5 ml cyclohexene were poured into a 200-ml flask with the atmosphere sufficiently replaced by a nitrogen gas, and the mixture was stirred at −78° C. for 1 hour. Then, propylene was polymerized in the same manner as in Example 5, and by analysis of the resulting polymer (0.16 g) by GPC, two peaks were obtained. Mn of one peak (relative peak area: 4%) was 30,000, and Mn of the other peak (relative peak area: 96%) was 15,100.

EXAMPLE 7

The mixture was stirred at −78° C. for 1 hour in the same manner as in Example 6 except that the amount of cyclohexene used was 25 ml. Then, propylene was polymerized in the same manner as in Example 5, and by analysis of the resulting polymer (0.46 g) by GPC, two peaks were obtained. Mn of one peak (relative peak area: 11%) was 23,600, and Mn of the other peak (relative peak area: 89%) was 12,000.

EXAMPLE 8

The mixture was stirred at −78° C. for 1 hour in the same manner as in Example 6 except that 25 ml of 2-methyl-1-pentene was used in place of 2.5 ml cyclohexene. Then, propylene was polymerized in the same manner as in Example 2, and by analysis of the resulting polymer (0.48 g) by GPC, two peaks were obtained. Mn of one peak (relative peak area: 7%) was 29,400, and Mn of the other peak (relative peak area: 93%) was 14,600.

EXAMPLE 9

The mixture was stirred at −78° C. for 1 hour in the same manner as in Example 6 except that 25 ml of 1-methyl-cyclohexene was used in place of 2.5 ml cyclohexene. Then, propylene was polymerized in the same manner as in Example 2, and by analysis of the resulting polymer (0.80 g) by GPC, two peaks were obtained. Mn of one peak (relative peak area: 14%) was 27,000, and Mn of the other peak (relative peak area: 86%) was 14,000.

EXAMPLE 10

The mixture was stirred at −78° C. for 1 hour in the same manner as in Example 6 except that 25 ml of 2-methyl-2-pentene was used in place of 2.5 ml cyclohexene. Then, propylene was polymerized in the same manner as in Example 5, and by analysis of the resulting polymer (0.55 g) by GPC, two peaks were obtained. Mn of one peak (relative peak area: 19%) was 38,900, and Mn of the other peak (relative peak area: 81%) was 15,000.

EXAMPLE 11

The mixture was stirred at −78° C. for 2 hours in the same manner as in Example 7 except that 1,8-nonadiene was used in place of 1,7-octadiene. Then, propylene was polymerized in the same manner as in Example 5, and by analysis of the resulting polymer (0.83 g) by GPC, two peaks were obtained. Mn of one peak (relative peak area: 23%) was 29,200, and Mn of the other peak (relative peak area: 77%) was 15,200.

EXAMPLE 12

The mixture was stirred at −78° C. for 2 hours in the same manner as in Example 7 except that 1,9-decadiene was used in place of 1,7-octadiene. Then, propylene was polymerized in the same manner as in Example 5, and by analysis of the purified polymer (0.72 g) by GPC, two peaks were obtained. Mn of one peak (relative peak area: 17%) was 27,900, and Mn of the other peak (relative peak area: 83%) was 14,200.

EXAMPLE 13

Introduction of Carboxyl Groups

Propylene was polymerized in the same manner as in Example 11. Then, carbon monoxide and the polymer were fed to an autoclave and pressurized at 30 atmospheric pressure at which the product was reacted for 1 hour under stirring. After the reaction was finished, the carbon monoxide gas was purged and the reaction solution was poured into ethanol cooled at −78° C. to precipitate the polymer. The resulting polymer was washed 5 times with 500 ml ethanol and dried. The resulting polymer indicated Mn of 76,200 (relative peak area: 24%) and Mn of 33,700 (relative peak area: 76%). Then, this polymer was fractionated by GPC (chloroform, room temperature), and an IR absorption spectrum of the isolated polymer having Mn of 72,100 and Mn of 20,400 was analyzed. The number of carbonyl groups in 1 molecule of the polymer was determined as follows.

The number of carbonyl groups in 1 molecule of the polymer is proportional to (number average molecular weight of the polymer)×(IR absorption strength of the carbonyl group/IR absorption strength of the polymer).

As a result, the number of carbonyl groups is (72,100×0.022)/(20,400×0.038)=2.0, indicating that the number of carbonyl groups in 1 molecule of the high-molecular-weight component was about twice as high as that of the low-molecular-weight component. It was thus revealed that the high-molecular-weight polymer obtained in this example had carbonyl groups at both the terminals.

REFERENCE EXAMPLE 1

6.4 ml toluene, 0.5 mM V (acetyl acetonate)$_3$ solution in toluene, and 5 mM diethyl aluminum chloride solution in toluene were poured into a 200-ml flask with the atmosphere sufficiently replaced by a nitrogen gas, and the mixture was stirred at −78° C. for 1 hour, and then 35 g propylene was added thereto and polymerization was initiated at −78° C. After 2 hours, the reaction solution was poured into methanol cooled at −78° C. to precipitate the polymer. The resulting polymer was washed 5 times with 500 ml methanol and then dried. By analysis of the formed polymer (0.15 g) by GPC, one peak was obtained, and its Mn was 16,200.

As is evident from the results of the Examples and Reference Example, a high-molecular-weight new living polymer, which is not formed by the catalyst consisting exclusively of V (acetyl acetonato)$_3$ and diethyl aluminum chloride, is formed when a product obtained by contacting diene such as 1,7-octadiene with the catalyst consisting of V (acetyl acetonato)$_3$ and diethyl aluminum chloride is used for polymerization of propylene.

Further, when cycloolefins such as cyclohexene and 1-methyl-cyclohexene, internal olefins such as 2-methyl-2-pentene, and olefins substituted at the 2-position such as 2-methyl-1-pentene, are allowed to be present while contacting diene such as 1,7-octadiene with the catalyst, the proportion of the above-mentioned high-molecular-weight new living polymer formed is increased.

Further, when reacting a carbon monoxide gas with the new living polymer obtained above, telechelic polypropylene modified with carbonyl groups at both the terminals thereof can be obtained.

INDUSTRIAL APPLICABILITY

The catalyst of the present invention can be used for polymerization of olefins to give living polymers having active sites at all the terminals of polyolefins, and by reacting a functional group attaching compound with the active site, telechelic olefin polymers having functional groups at all the terminals thereof can be produced.

What is claimed is:

1. A catalyst for producing living olefin polymers having a plurality of active sites, obtained by contacting a catalyst having the ability to cause ethylene and/or olefins (excluding ethylene) (olefins I) to undergo living coordination polymerisation, with a compound having a plurality of intramolecular carbon-carbon double bonds, in the presence of olefins selected from the group consisting of monocycloolefins, internal olefins, and olefins substituted at the 2-position (olefins II) not polymerised by said catalyst having the ability to cause living coordination polymerisation.

2. The catalyst for producing living olefin polymers according to claim 1, wherein the olefins I are α-olefins of 3 to 8 carbon atoms.

3. The catalyst for producing living olefin polymers according to claim 1, wherein said catalyst having the ability to cause living coordination polymerization comprises a vanadium compound represented by the general formula I:

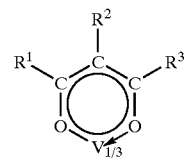

I wherein $R^1$ to $R^3$ represent a hydrogen atom or a hydrocarbon group of 1 to 8 carbon atoms provided that at least one of $R^1$ to $R^3$ is a hydrogen atom but not all $R^1$ to $R^3$ are hydrogen atoms and an organoaluminum compound represented by the general formula $R_nAlX_{3-n}$ wherein R represents an alkyl group of 1 to 18 carbon atoms or an aryl group, X represents a halogen atom or a hydrogen atom, and n is an arbitrary real number in the range of $1 \leq n < 3$.

4. The catalyst for producing living olefin polymers according to claim 1, wherein said compound having a plurality of intramolecular carbon-carbon double bonds is an α,ω-unconjugated diene of 5 to 14 carbon atoms.

5. A process for producing living olefin polymers, comprising homopolymerization or copolymerization of ethylene and/or olefins (excluding ethylene) in the presence of the catalyst for producing living olefin polymers described in claim 1.

6. The catalyst for producing living olefin polymers according to claim 2, wherein said catalyst having the ability to cause living coordination polymerisation comprises a vanadium compound represented by the general formula I

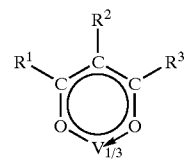

I wherein $R^1$ to $R^3$ represent a hydrogen atom or a hydrocarbon group of 1 to 8 carbon atoms provided that at least one of $R^1$ to $R^3$ is a hydrogen atom but not all $R^1$ to $R^3$ are hydrogen atoms and an organoaluminum compound represented by the general formula $R_nAlX_{3-n}$ wherein R represents an alkyl group of 1 to 18 carbon atoms or an aryl group, X represents a halogen atom or a hydrogen atom, and n is an arbitrary real number in the range of $1<n<3$.

7. The process for producing living olefin polymers according to claim 5, wherein said olefins are α-olefins of 3 to 8 carbon atoms.

8. The process for producing living olefin polymers according to claim 7, comprising homopolymerization of propylene or copolymerization thereof with ethylene.

9. The catalyst for producing living olefin polymers according to claim 2, wherein said compound having a plurality of intramolecular carbon-carbon double bonds is an α,ω-unconjugated diene of 5 to 14 carbon atoms.

10. The catalyst for producing living olefin polymers according to claim 3, wherein said compound having a plurality of intramolecular carbon-carbon double bonds is an α,ω-unconjugated diene of 5 to 14 carbon atoms.

* * * * *